US012696333B2

(12) United States Patent
Prakash et al.

(10) Patent No.: US 12,696,333 B2
(45) Date of Patent: Jul. 28, 2026

---

(54) CAPACITY SCHEME FOR MULTI-RAT DUAL CONNECTIVITY

(71) Applicant: Outdoor Wireless Networks LLC, Richardson, TX (US)

(72) Inventors: Shiva Prakash, Bangalore (IN); Nandish Chalishazar, Nashua, NH (US); Devulapalli Venkata Surya Narayana Murthy, Bangalore (IN)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 19/105,281

(22) PCT Filed: Aug. 2, 2023

(86) PCT No.: PCT/US2023/029333
§ 371 (c)(1),
(2) Date: Feb. 20, 2025

(87) PCT Pub. No.: WO2024/044025
PCT Pub. Date: Feb. 29, 2024

(65) Prior Publication Data
US 2026/0012990 A1 Jan. 8, 2026

(30) Foreign Application Priority Data

Aug. 21, 2022 (IN) .............................. 202241047538

(51) Int. Cl.
*H04W 76/15* (2018.01)
*H04W 8/24* (2009.01)

(52) U.S. Cl.
CPC ............. *H04W 76/15* (2018.02); *H04W 8/24* (2013.01)

(58) Field of Classification Search
CPC ................................. H04W 76/15; H04W 8/24
See application file for complete search history.

(56) References Cited

U.S. PATENT DOCUMENTS

2015/0043500 A1  2/2015  Kim et al.
2015/0139161 A1  5/2015  Dinan
(Continued)

FOREIGN PATENT DOCUMENTS

WO  2024044025 A1  2/2024

OTHER PUBLICATIONS

International Searching Authority, "International Search Report and Written Opinion", dated Nov. 27, 2023, from PCT Application No. PCT/US2023/029333, pp. 1 through 12, Published: WO.

*Primary Examiner* — Barry W Taylor
(74) *Attorney, Agent, or Firm* — Fogg & Powers LLC

(57) ABSTRACT

Capacity schemes for Multi-RAT dual connectivity are described herein. For example, a system includes user equipment; a secondary node that communicates with the user equipment through cells in a secondary cell group; and a master node. The master node communicates with the user equipment through cells in a master cell group; prioritizes the cells based on system parameters for the master node, the secondary node and capabilities of the user equipment; identifies one or more cells in the secondary cell group; and transmits a message to the secondary node identifying the one or more cells. The secondary node connects to the user equipment through the one or more cells identified in the message in addition to a connection to the main node; and prioritizes the cells in the secondary cell group based on communications through the one or more secondary cells with the user equipment.

20 Claims, 4 Drawing Sheets

(56) References Cited

U.S. PATENT DOCUMENTS

| | | | |
|---|---|---|---|
| 2020/0154499 A1* | 5/2020 | Futaki | H04W 76/15 |
| 2020/0221399 A1 | 7/2020 | Hosseini et al. | |
| 2021/0076273 A1 | 3/2021 | Zhou et al. | |
| 2022/0061115 A1* | 2/2022 | Takahashi | H04L 5/001 |
| 2022/0158794 A1 | 5/2022 | Zhang et al. | |
| 2023/0363026 A1* | 11/2023 | Futaki | H04W 76/15 |

* cited by examiner

400

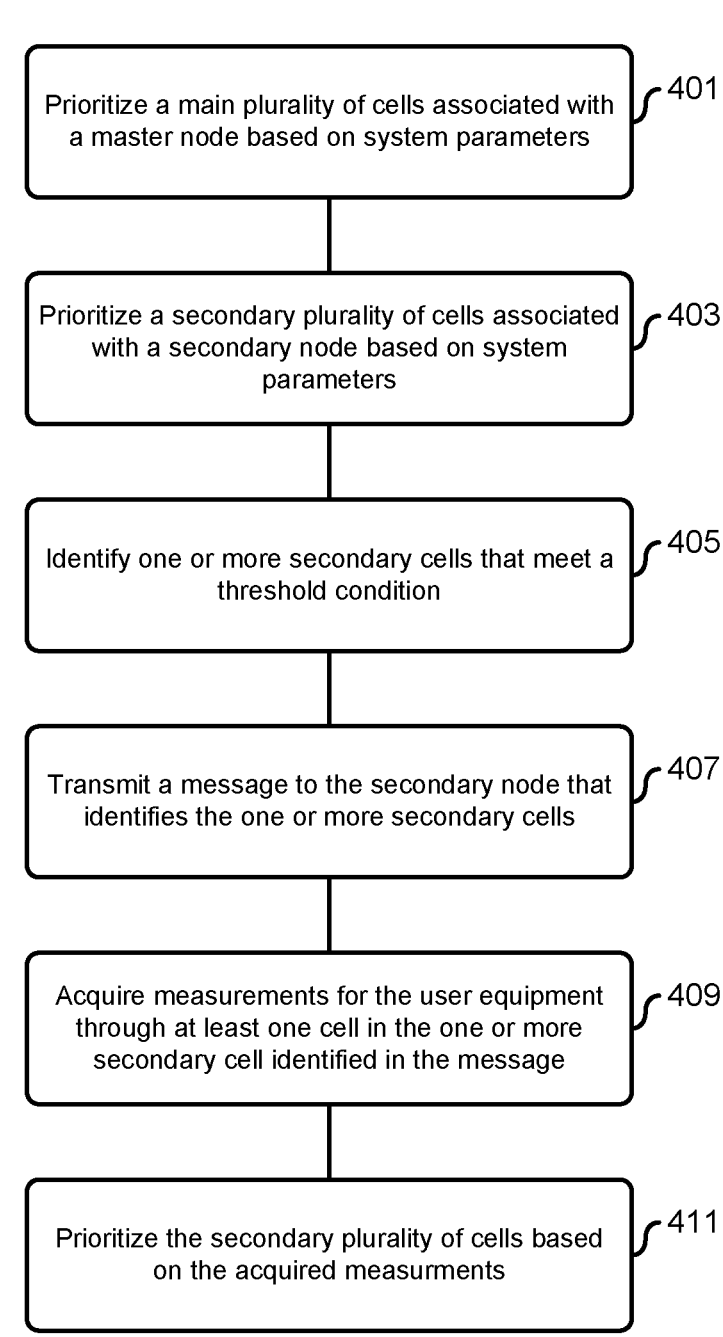

Prioritize a main plurality of cells associated with a master node based on system parameters — 401

Prioritize a secondary plurality of cells associated with a secondary node based on system parameters — 403

Identify one or more secondary cells that meet a threshold condition — 405

Transmit a message to the secondary node that identifies the one or more secondary cells — 407

Acquire measurements for the user equipment through at least one cell in the one or more secondary cell identified in the message — 409

Prioritize the secondary plurality of cells based on the acquired measurments — 411

FIG. 4

CAPACITY SCHEME FOR MULTI-RAT DUAL CONNECTIVITY

CROSS-REFERENCE TO RELATED APPLICATIONS

This application is a 371 National Stage Application of International Application No. PCT/US2023/029333, filed on Aug. 2, 2023, which claims the benefit of Indian Provisional Application No. 202241047538, filed on Aug. 21, 2022, both of which are hereby incorporated herein by reference in their entirety.

BACKGROUND

Evolved Universal Terrestrial Radio Access Network (E-UTRAN) comprises one or more base stations that wirelessly communicate with user equipment (UE), such as smartphones using licensed radio frequency spectrum and the Long Term Evolution (LTE) protocol. The base station of E-UTRAN is called an Evolved Node B (also generally referred to as "eNodeB" or "eNB"). When the eNB connects to the Evolved Packet Core (EPC), it is referred to as an eNB. When the eNB connects to the Fifth Generation Core (5GC), it is referred to as an ng-eNB.

Next Generation Radio Access Network (NG-RAN) comprises one or more base stations that wirelessly communicate with UEs, such as smartphones using licensed radio frequency spectrum and the New Radio (NR) protocol. The base station of NG-RAN is called a Next Generation Node B (also generally referred to as a "gNodeB" or "gNB"). When the gNB connects to the EPC, it is referred to as an en-gNB. When the gNB connects to the 5GC, it is referred to as a gNB.

3rd Generation Partnership Project (3GPP) provides for a dual connectivity mode of operation where a UE may be configured to utilize resources provided by two different Radio Access Network (RAN) nodes connected via a non-ideal backhaul. A RAN node that handles control plane connectivity of the UE to the core network is referred to as a Master Node (MN 101), and the other RAN node is referred to as a Secondary Node (SN 121).

There are multiple types of dual connectivity. One type of dual connectivity is called Intra-E-UTRA Dual Connectivity (DC), which includes an MN 101 and SN 121 that both provide E-UTRA access. For DC, the MN 101 is called an MeNB, and the SN 121 is called an SeNB.

Another type of dual connectivity is generally called Multi-Radio Dual Connectivity (MR-DC), which includes one of the RAN nodes providing NR access and the other RAN node providing either E-UTRA or NR access. There are several specific types of MR-DC that depend on how the RAN nodes connect to the core network.

One type of MR-DC includes the MN 101 of the UE being connected to an EPC core network, and the involved core network entity is the mobility management entity (MME). This type of MR-DC is referred to as E-UTRA-NR Dual Connectivity (EN-DC). EN-DC specifically includes an MN 101 providing E-UTRA access connected to an EPC core network, and SN 121 provides NR access. The MN 101 is called an MeNB, and the SN 121 is called an SgNB or en-gNB. For EN-DC, the MN 101 uses the S1-C protocol for control plane communication with MME. The MN 101 and SN 121 may use the S1-U protocol for user plane communication with the SGW of the EPC. The MN 101 and SN 121 communicate using the X2-C protocol for control plane communications and the X2-U protocol for user plane communications.

Other types of MR-DC include the MN 101 of the UE being connected to the 5GC, and the involved core network entity is the Access and Mobility Function (AMF). The MN 101 uses the NG-C protocol for control plane communication with AMF. The MN 101 and SN 121 may use the NG-U protocol for user plane communication with a User Plane Function (UPF) of 5GC. The MN 101 and SN 121 communicate using the Xn-C protocol for control plane communications and the Xn-U protocol for user plane communications.

One type of MR-DC using the 5GC is called NR-E-UTRA Dual Connectivity (NE-DC), which includes an MN 101 providing NR access to a UE that is connected to the 5GC and an SN 121 providing E-UTRA access to the UE. Another type of MR-DC using the 5GC is called NG-RAN E-UTRA-NR Dual Connectivity (NGEN-DC), which includes an MN 101 providing E-UTRA access to a UE that is connected to the 5GC and an SN 121 providing NR access to the UE. Yet another type of MR-DC using the 5GC is called NR-NR Dual Connectivity (NR-n DC), which includes an MN 101 providing NR access to a UE connected to 5GC and an SN 121 also providing NR access to the UE.

When a UE connects to an MN 101 providing E-UTRA access to utilize the services of the EPC core network and connects to an SN 121 providing NR access, it is said to be in Non-Standalone (NSA) mode. EN-DC is an example of an NSA mode of operation.

When a UE connects to an MN 101, providing NR access to utilize the services of the 5GC core network, it is said to be in standalone (SA) mode. A UE in SA mode may or may not use MR-DC. Types of MR-DC allowed for a UE in SA mode are NE-DC and NR-DC.

A central security gateway (SeGW) function is typically implemented between an operator's core network and RAN nodes to secure communications between the core network and the RAN nodes (for example, eNBs and gNBs). In such implementations, S1-C, S1-U, Ng-C, and Ng-U interface traffic passes through the SeGW to reach the respective core network entities. The central SeGW function can be implemented as a separate physical entity or as part of another node.

In one configuration, even though the X2-interface endpoints lie within the RAN network, X2-interface traffic can pass through SeGW to provide security. This configuration is also referred to here as an "X2 Star" architecture. In the X2 Star architecture, IPSec Tunnel Mode (defined by the relevant IPSec standard) is used for X2-interface communications between the MN 101 and the SN 121.

SUMMARY

Systems and Methods for a capacity scheme for Multi-RAT dual connectivity are described herein. In certain embodiments, a system includes user equipment. The system also includes a secondary node configured to communicate with the user equipment through a secondary plurality of cells in a secondary cell group. Further, the system includes a master node configured to communicate with the user equipment through a main plurality of cells in a master cell group. Further, the master node is configured to prioritize the main plurality of cells and secondary plurality of cells based on system parameters for the master node, the secondary node and capabilities of the user equipment. Also, the master node is configured to identify one or more secondary cells in the secondary plurality of cells. Moreover, the master node is configured to transmit a message to the secondary node identifying cells in the one or more secondary cells. The secondary node is configured to connect to the user equipment through at least one secondary cell in the cells identified in the message in addition to a connection to the main node. Also, the secondary node is configured to prioritize the secondary plurality of cells based on communications through the at least one secondary cell and the user equipment.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

FIG. 4 is a flowchart diagram for a method for a capacity scheme for multiple RAT dual connectivity according to an aspect of the present disclosure.

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific illustrative embodiments. However, it is to be understood that other embodiments may be used and that logical, mechanical, and electrical changes may be made.

Systems and embodiments described herein provide for a capacity scheme for Multi-RAT dual connectivity. For example, embodiments described herein provide for systems that can choose the best band combination from possible band combinations in an MR-DC scheme that enhances UE 111 and system capacity from a NodeB point of view. Further, selecting a best band combination may aid radio planning for deployment purposes from the point of view of an operator point. The system identifies the best band combination by prioritizing carriers in the available band combination sets that can offer higher throughput while configuring measurements during MR-DC additions. Additionally, band combination sets can be dynamically chosen to provide higher throughput in response to varying radio conditions.

Figure 1:
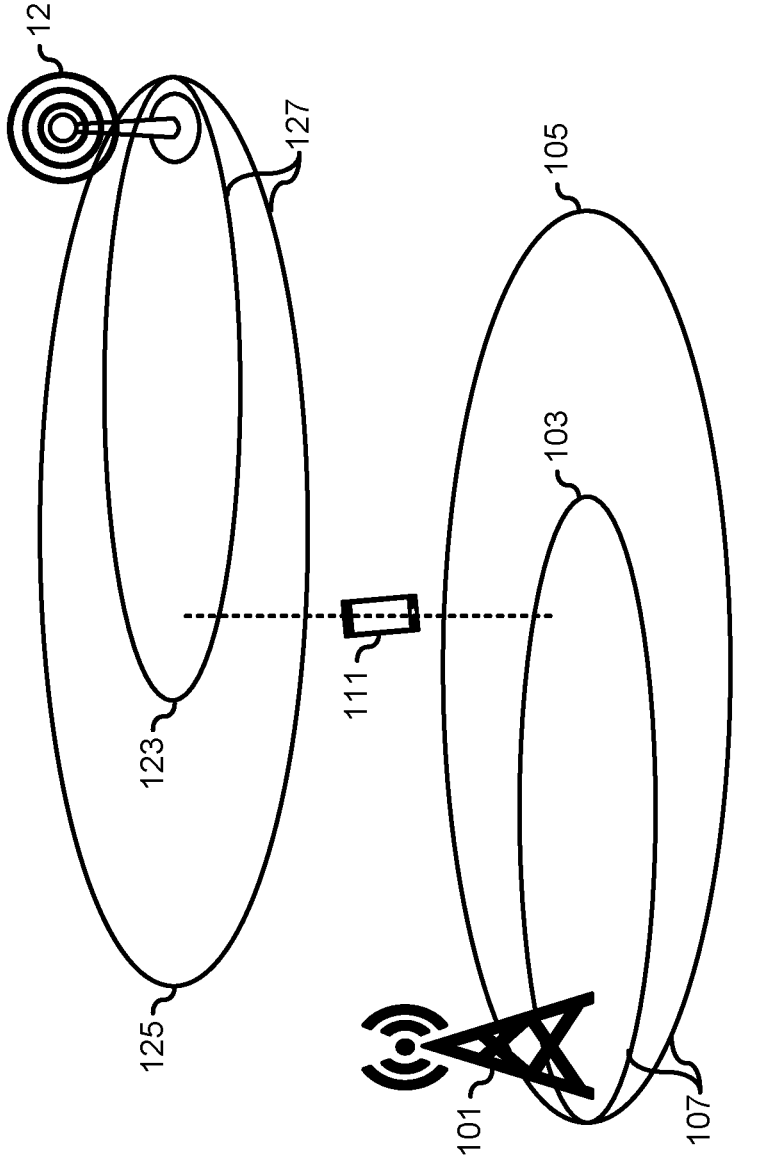
FIG. 1 is a diagram illustrating user equipment communicating with multiple nodes using dual connectivity according to an aspect of the present disclosure.

FIG. 1 illustrates a network diagram of a UE 111 that can communicate with a master node (MN 101) 101 and a secondary node (SN 121) 121 according to a multiple radio access technology (RAT) dual connectivity (MR-DC) scheme. As used herein, the MN 101 may refer to an LTE base station (also referred to herein as "LTE Evolved Node B," "eNodeB," or "eNB"), and the SN 121 may refer to a 5G base station (also referred to herein as "Next Generation Node B," "gNodeB," or "gNB"). In other examples, the MN 101 is a 5G base station, and the SN 121 is an LTE base station. In other examples, both of the MN 101 and the SN 121 are 5G base stations. The UE 111 may be a smartphone or other device that uses licensed radio frequency spectrum.

Each of the MN 101 and the SN 121 may be associated with a cell group. In particular, the MN 101 is associated with a master cell group (MCG) 107, and the SN 121 is associated with a secondary cell group (SCG) 127. A cell group may refer to a group of cells with different carriers and bandwidths supporting communications between the UE 111 and a node. For example, the MN 101 may be associated with a master cell group 107, having a first MCG PCell 103 and a second MCG PCell 105. Additionally, the SN 121 may be associated with a second cell group 127, having a first SCG PCell 123 and a second SCG PCell 125.

Due to dissimilar system configurations, the MN 101 and SN 121 may offer different capacities. For example, the MN 101 and the SN 121 may support different system bandwidths. The MN 101 and the SN 121 may also support different primary and mapped frequency bands. Also, the MCG 107 and the SCG 127 may include different numbers of carriers of cells. Moreover, the MN 101 and SN 121 may support different multiple-input multiple-output (MIMO) schemes. Further, only one of the MN 101 and SN 121 may support carrier aggregation (CA). The MN 101 and SN 121 may have additional dissimilar configurations. As stated above, the MR-DC schemes described herein can increase the capacity or throughput for a UE 111 by using an SN 121, implementing dual connectivity, and using CA at either node to further increase capacity.

In certain scenarios, the system configurations of the MN 101 or SN 121, the system 100, or the capability of the UE 111 affect the throughput. For example, the UE 111 can be configured to yield a higher throughput in certain supported band combinations than in other supported band combinations. For example, the UE 111 may have higher throughput for some band combinations because either the MN 101 or SN 121 may support higher bandwidths for certain operating bands/carriers (primary or mapped). In particular, the MN 101 may support L bands/carriers, and the SN 121 may support N bands/carriers where the L bands/carriers and N bands/carriers have different bandwidths. Further, carrier aggregation may be enabled only at the MN 101, which may yield higher throughput for the UE 111 than is available with MR-DC. Additionally, the MN 101 and SN 121 may support different numbers of maximum MIMO layers, or the UE 111 may support different MIMO layers in different bands offered by the MN 101 and SN 121. Accordingly, choosing and configuring the UE 111 with particular band combinations can increase the UE 111 throughput and system throughput.

Further, a UE 111 may have a set of acceptable thresholds to satisfy before the UE 111 operates over particular carriers. For some UEs 111, the identified band combination may not meet the set of acceptable thresholds. Moreover, a UE 111, MN 101, and SN 121 may wait for the reception of measurements from each other before setting up the MR-DC. Waiting for the reception and processing of the measurements may increase the latency for setting up the MR-DC. Thus, a scheme for prioritizing the measurements for a chosen set of carriers can be configured for setting MR-DC for the UE 111. Additionally, the band combinations can be dynamically determined based on the measurements available for these carriers.

In certain embodiments, with MR-DC, the MN 101 and SN 121 can proactively determine band combinations among the bands supported by the UE 111, the MN 101, and the SN 121 that increase the capacity for the UE. The MN 101 and SN 121 proactively determine a band combination by obtaining system parameters for the MN 101 and SN 121. The parameters may include the bandwidth of the carriers associated with the different cells in the MCG 107 and the SCG 127 and the capability of the UE 111. The parameters may also describe the supported bands of the MN 101 and SN 121 (FDD or TDD and associated primary and secondary mapped bands as found in a multi-frequency band indicator (MFBI)). Other parameters include the MIMO configurations of the MN 101, SN 121, and UE 111, CA capabilities, and the like. The MN 101 may communicate with the SN 121 through a communication interface to acquire the system parameters. For example, the communication interface may be an X2 interface for EN-DC, NE-DC, NGEN-DC, etc., and an Xn interface for NR-DC. Further, the MN 101 or SN 121 may communicate with the UE 111 to obtain the capability of a UE 111 regarding the band combinations supported by the UE 111 over the carriers supported in an MR-DC system.

In exemplary embodiments, when the MN 101 or SN 121 has identified the supported band combinations, the MN 101 or SN 121 may identify a particular band combination based on the obtained system parameters and the band combinations supported by the UE 111 using the following equation:

$$M^*, S^* = \mathop{\arg\max}_{\substack{\forall\, l \in L \\ \forall\, n \in N}} C_{MR-DC}.$$

As shown, M\*, S\* is a set of carrier combinations supported by the MN 101 and SN 121 that are respectively associated with separate cells in the MCG 107 and the SCG 127 that are associated with a maximum throughput $C_{MR-DC}$, where $1 \le |M^*| \le |L|$, $0 \le |S^*| \le |N|$. Further, the MN 101 and the SN 121 may obtain other band combination pairs $M_x$, $S_x$ and sort them in order of decreasing throughput, where $1 \le x \le B$, where B is the total number of band combination pairs supported by the MN 101, SN 121, and UE 111. In some implementations, the S\* or $S_x$ may be an empty set for a UE 111. An empty set for S\* or $S_x$ may indicate that there is no optimal band combination with a carrier combination (CC) for the SN 121 that maximizes $C_{MR-DC}$. When the S\* or $S_x$ is an empty set, the MN 101 can choose not to enable DC for the UE 111, and the MN 101 can enable the UE 111 with CA using the carriers in the set M\*.

In certain embodiments, when the M\*, S\* are identified, the MN 101 and SN 121 may choose to do a blind addition when there is sufficient overlap of the PCell 103 (Primary Cell), SCells 105 (Secondary Cells), and PScell 123 (Primary cell of SN 121) of the MR-DC system. As used herein, a blind addition may refer to the addition of the UE 111 to a cell in the MR-DC system 100 without considering the measurements acquired by the MN 101 and the SN 121. Similarly, the SN 121 may choose to do a blind addition of its SCells if it is known that there is sufficient overlap of the PScell 123 and SCells 125 of the SN 121. As described herein, cells have sufficient overlap when the cells are associated with the same bands, or other similar configuration. However, the MN 101 and SN 121 may determine that the primary and secondary cells do not sufficiently overlap when there is an absence of co-located radio modules for secondary cell addition, or the UE 111 is not seeing sufficient signal strength on the same carriers in different cells. Additionally, there may not be sufficient overlap when one carrier is a TDD carrier of higher frequency having a smaller coverage area than a lower frequency FDD carrier having a higher coverage area. Further, there may not be sufficient overlap when the UE 111 falls out of coverage of one or more cells in M\*, S\*. In some embodiments, when there is insufficient overlap to do a blind addition, the MN 101 and SN 121 may use the acquired measurements to identify a band combination that enhances the capacity for the UE 111.

In certain embodiments, the MN 101 and SN 121 may prioritize the available bands for establishing MR-DC. Before performing band prioritization, the UE 111 may be attached over the PCell 103 of the MCG 107 of the MN 101 using the carrier, $1_{pcell-MCG}$, which belongs to M\*, and S\* corresponds to M\*. To prioritize the available bands, the MN 101 and SN 121 may each perform steps as part of a band prioritization algorithm.

In certain embodiments, the MN 101 may proceed by identifying the band prioritization by configuring the UE 111 for measurement reports and prioritizing the A4 (Intra-RAT) measurements in the MCG 107 for MCG-SCells 105 for the carriers in the set M\*. The MN 101 prioritizes measurements for one carrier over another carrier by setting a different measurement event threshold (or associated event measurement parameters) to increase the chances of triggering the measurement event condition for the preferred carrier, as a lower threshold may cause an event to trigger faster. For example, the measurement event thresholds may include a time to trigger (TTT). A lower TTT and a higher carrier-specific offset may increase the chances of a carrier getting reported first or earlier. In some implementations, among the $MCG_{SCellG}=M^*-1_{pcell-MCG}$ containing $|M^*|-1$ carriers, the MN 101 can prioritize the carriers based on offered throughput. For example, according to the following equation:

$$l' = \mathop{\arg\max}_{l \in MCG_{SCellG}} C_{MN}^l$$

the carrier l' which has the highest throughput in the MN 101 for the UE 111, can be configured to have the highest priority.

In further embodiments, the MN 101 also parallelly prioritizes the B1 measurements (Inter-RAT) from the perspective of the MN 101 of the PSCell 123 of the SCG 127 in S\* for $|S^*|$ for the carriers of the SN 121, based on offered throughput. For example, out of the measurement configurations for $|S^*|$ carriers, the carrier n' can be selected according to the following equation:

$$n' = \mathop{\arg\max}_{\forall\, n \in S^*} C_{SN}^n.$$

The carrier n' may be the carrier with the highest throughput in the SN 121 for the UE 111. The MN 101 can configure the carrier n' to have the highest priority in the measurement configuration.

In exemplary embodiments, when the MN 101 receives the measurements for carriers in the set S\* that meet the threshold conditions, the MN 101 sends the set S\* to the SN 121 in a message transmitted through an interface between the MN 101 and the SN 121. For example, the MN 101 may send the set S\* as part of the SgNB Addition Request message (X2)/S-Node Addition Request (Xn) to the SN 121.

The MN 101 may also send the available measurement results for the carriers S*. In some limitations, the MN 101 may join a group of measurement reports for multiple carriers in the set S*, but joining the group of measurements may increase dual connectivity latency, and the UE 111 might not meet threshold criteria for the carriers in the set S*. For example, the UE 111 may take an increased amount of time to acquire measurements and report the measurements for the carriers, where the reporting is based on the set thresholds configured for the respective carriers. Thus, the MN 101 may not wait to receive the measurement reports for all the cells being measured by the UE 111. For example, the MN 101 may wait for the measurements associated with the MCG, SCG cells that are readily available to the MN 101 within a certain time window, or a first set of measurements that are received from either the MCG or SCG.

In response to the indication of the set S* received through the interface between the SN 121 and the MN 101, the SN 121 may receive and accept the indication of the set S*. For example, the SN 121 may receive the SgNB Addition Request message (X2)/S-Node Addition Request (Xn) from the MN 101. The SN 121 may accept the SgNB Addition Request message (X2)/S-Node Addition Request (Xn) from the MN 101 and records the set S*. The SN 121 proceeds to set up admission for the UE 111 on the PSCell 123 with the carrier $k_{pscell-SCG} \in$ S* based on the measurements from the MN 101 along with other admission control checks.

In additional embodiments, when the UE 111 is attached to a carrier $k_{pscell-SCG} \in$ S that is on the PSCell 123, the SN 121 may prioritize the measurements based on the offered throughput for the SCell 125 in the SCG 127 in S* for the other $|S*|-1$ SN 121 carriers in $SCG_{SCellG}=S*-K_{pscell-SCG}$. For example, out of the measurement configurations for $|S*|-1$ carriers, the carrier k' which has the highest throughput in the SN 121 for the UE 111, can be configured to have the highest priority in the measurement configuration based on the following equation:

$$k' = \underset{k \in SCG_{SCellG}}{\arg \ \max} \ C^k_{SN}.$$

In some embodiments, the MN 101 may dynamically change the set of carriers based on radio conditions. For example, the above-described algorithm for increasing capacity in an MR-DC assumes that the UE 111 is already attached over the PCell 103 in the MCG 107 of the MN 101 with the carrier, $l_{pcell-MCG}$, which belongs to the set M*. In at least one scenario, the MN 101 can dynamically change the set of carriers when the UE 111 attaches to a different carrier $l'_{pcell-MCG}$ that does not belong to the set M*. The MN 101 can continue operating with the current carrier $l'_{pcell-MCG}$ attached to the UE 111, and find an additional band combination set from the stored set $M_x$, $S_x$, where $l'_{pcell-MCG} \in M_x$. With the $M_x$, $S_x$, where $l'_{pcell-MCG} \in M_x$, the MN 101 can set M*=$M_x$ and S*=$S_x$ and then send M*, S* to the SN 121 where $MCG_{SCellG}=M_x-l'_{pcell-MCG}$.

In an additional scenario, the UE 111 may already be attached through PCell 103 in the MCG 107 of the MN 101 with the carrier, $l_{pcell-MCG}$, which belongs to a set $M_x$. There is a possibility that the UE 111 might not always report or meet threshold conditions on all $MCG_{SCellG}=M_x-l_{pcell-MCG}$ carriers or S* carriers. Hence the MN 101 can also monitor the measurements over L and N carriers and reconfigure the UE 111 to a new band combination based on the measurement reports. If a subset $L' \subseteq L$ and $N' \subseteq N$ of the carriers meet measurement threshold conditions for MR-DC, then the MN 101 recomputes the best combination set for the UE 111 using L' and N' according to the following equation:

$$M^*, S^* = \underset{\substack{\forall\, l \in L' \\ \forall\, n \in N'}}{\arg \ \max} \ C_{MR-DC}.$$

In certain embodiments, when an MN 101 or SN 121 calculates a data rate $C^j$ supported by the UE 111 in EUTRA or NR for the $j^{th}$ component according to the following equation:

$$C^{(j)}_{system}(\text{Mbps}) = 10^{-6} \cdot \alpha^j \cdot v^{(j)}_{Layers} \cdot Q^{(j)}_m \cdot R_{max} \frac{N^{BW(j),\mu}_{PRB} \cdot 12}{T^\mu_s}.$$

In the equation, the system may refer to either an EUTRA or an NR system. The term $R_{max}$ may refer to a code rate 948/1024 for 64QAM. For the $j^{th}$ CC, the $$v^{(j)}_{Layers}$$

may be the maximum number of supported layers by a node. The $$Q^{(j)}_m$$

is the maximum supported modulation order. The $\mu$ is the numerology, where $\mu$ is always 0 for an EUTRA LTE system. Further, the $\alpha^j$ is the adjustment factor which depends on the duplex mode. Moreover, the $\alpha^j=1$ for LTE FDD scheme and $\alpha^j<1$ for LTE/NR TDD and depends on the TDD slot pattern used, where $\alpha^j$ can also take a value of 1 in NR. The $$T^\mu_s$$

may be the average OFDM symbol duration in a subframe for numerology $\mu$, i.e., $$T^\mu_s = \frac{10^{-3}}{14 \cdot 2^\mu}.$$

Note that a normal cyclic prefix is assumed. The $$N^{BW(j),\mu}_{PRB}$$

is the maximum RB allocation in bandwidth $BW^{(j)}$ with numerology $\mu$, where $BW^{(j)}$ is the supported maximum bandwidth in the given band or band combination.

In further embodiments, for MR-DC configured in EN-DC, NGEN-DC, NEDC, or NR-DC, the maximum data rate is computed as the sum of the maximum data rates from MN 101 and SN 121 for all the component carriers used. For example, the data rate may be calculated according to the following equation:

$$C_{MR-DC} = \sum_{l \in L} C_{MN}^{l} + \sum_{n \in N} C_{SN}^{n}.$$

In the equation, I is a CC belonging to set L containing the CC/s that can be configured for the UE 111 for MR-DC at the MN 101, and n represents a CC belonging to the set N containing the CCs that can be configured for the MR-DC for the UE 111 at SN 121.

Embodiments described herein provide for choosing the best band combination in MR-DC, enhance UE 111 and system capacity from a NodeB point of view, and are also an important part of radio planning for deployment purposes from an operator point of view. Band prioritization while configuring measurements during MR-DC addition gives priority to the measurements for the carriers that can offer higher throughput in the available band combination set. Additionally, dynamically choosing the optimal band combination set provides higher throughput for varying radio conditions.

Figure 2:
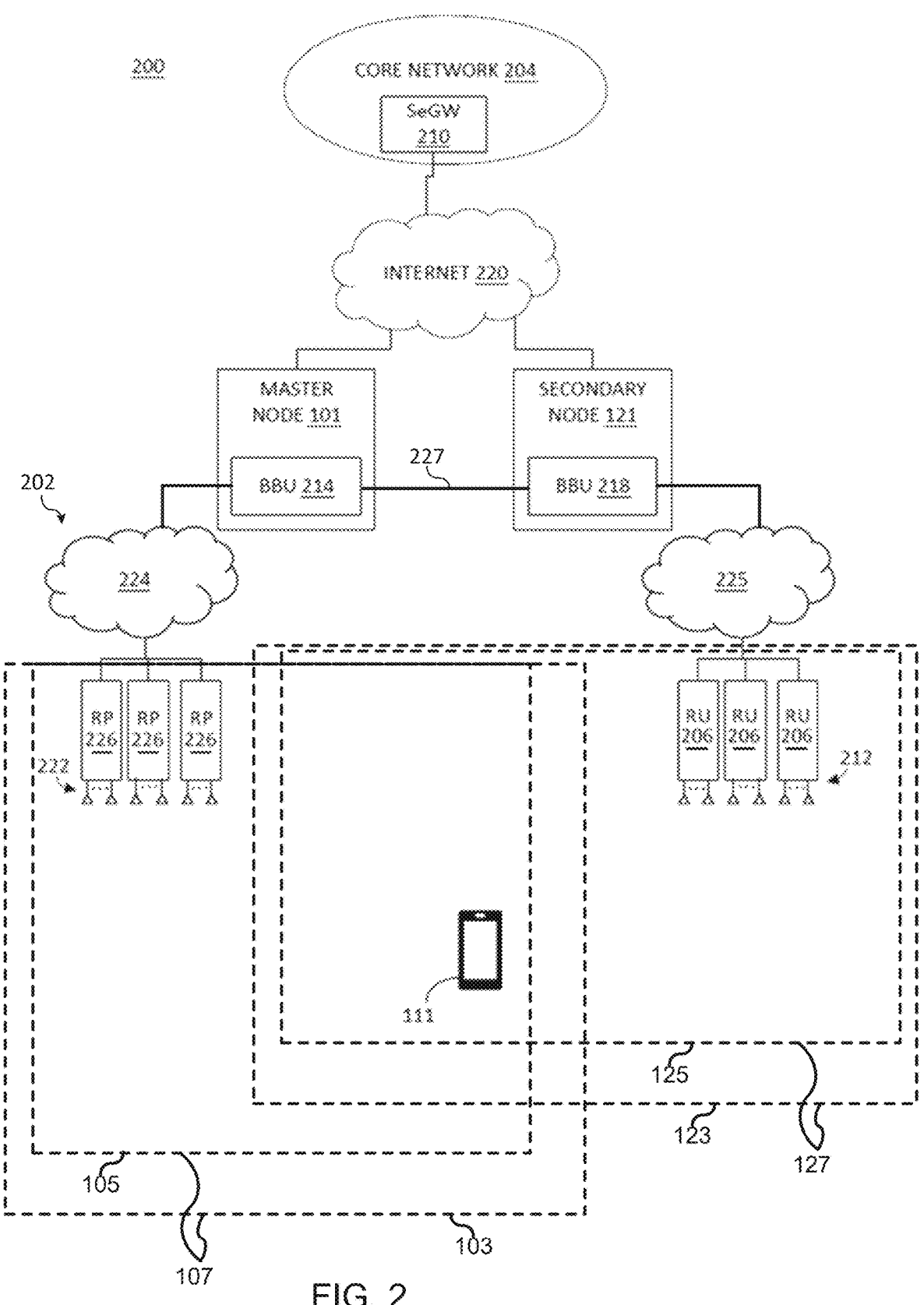
FIG. 2 is a block diagram illustrating user equipment connected to multiple nodes using dual connectivity according to an aspect of the present disclosure.

FIG. 2 is a block diagram of one exemplary embodiment of a wireless system 200 that may implement MR-DC for a UE 111 between an MN 101 and an SN 121. In the example shown in FIG. 2, the wireless system 200 comprises a radio access network (RAN) 202 and a core network 204. In this example, the RAN 202 includes an MN 101 (also referred to herein as a master base station) and an SN 221 (also referred to herein as a secondary base station) that are used to establish an MR-DC with the UE 111 with mobile access to a wireless network operator's core network 204 to enable the UE 111 to wirelessly communicate data and voice. In some examples, the MN 101 and the SN 121 are configured to operate in a non-standalone mode. In some examples, the MN 101 and the SN 121 are configured to operate in a Multi-Radio Dual Connectivity (MR-DC) mode as defined by 3GPP standard TS 37.340. In some implementations, the MN 101 is the radio access node that provides the control plane connection to the core network 204. The SN 121 is the radio access node with no control plane connection to the core network 204 that provides additional resources to the UE 111.

In some examples, the MN 101 is an LTE base station (also referred to herein as "LTE Evolved Node B," "eNodeB," or "eNB"), and the SN 121 is a 5G base station (also referred to herein as "Next Generation Node B," "gNodeB," or "gNB"). In other examples, the MN 101 is a 5G base station, and the secondary base station is an LTE base station. In other examples, the MN 101 and the secondary base station are 5G base stations.

In the example shown in FIG. 2, the core network 204 includes a Security Gateway (SeGW). In some examples, the core network 204 is implemented as an Evolved Packet Core (EPC) comprising standard LTE EPC network elements. In other examples, the core network 204 is implemented as a 5G Core (5GC) comprising standard 5GC network elements.

In the example shown in FIG. 2, the backhaul between the RAN 202 and the core network 204 is implemented using one or more IP networks (including, in this example, the Internet 220).

In examples where the core network 204 is implemented as an EPC, the MN 101 communicates with components in the core network 204 using the S1 interface and communicates with the SN 121 over the interface 227. The interface 227 may be an X2 interface. In such examples, the SN 121 communicates with components in the core network 204 using the S1-U interface and communicates with the MN 101 using the X2 interface. In examples where the core network 204 is implemented as a 5GC, the MN 101 communicates with components in the core network 204 using the NG interface, and the interface 227 used for communication with the SN 121 may be an Xn interface. In such examples, the SN 121 communicates with components in the core network 204 using the NG-U interface and communicates with the MN 101 using the Xn interface.

An MN 101 may function substantially as described above in connection with FIG. 1. Further, an MN 101 may be implemented using one or more baseband unit (BBU) entities 214 (also referred to herein simply as "BBUs") that interact with multiple remote units 226 (also referred to here as "RUs," "radio units," "radio points," or "RPs") to implement the various base-station functions necessary to implement the air-interface and to interact with the core network 204 to provide wireless service to various items of user equipment (UEs). In examples where the MN 101 is an LTE base station, the one or more BBUs 214 may comprise a single entity (sometimes referred to as a "baseband controller" or simply a "baseband band unit" or "BBU") that performs Layer-3, Layer-2, and some Layer-1 processing for the cell. In this example, each RP 226 is configured to implement the radio frequency (RF) interface and the physical layer functions for the associated base station that are not implemented in the BBU 214. The RPs 226 may be located remotely from each other (that is, the multiple remote units are not co-located), and the one or more BBUs 214 are communicatively coupled to the RPs 226 over a fronthaul network 224. In some examples, the fronthaul network 224 is a switched Ethernet fronthaul network (for example, a switched Ethernet network that supports the Internet Protocol (IP)).

In examples where the MN 101 is a 5G base station, the one or more BBUs 214 may also comprise multiple entities, for example, one or more central unit (CU) entities that implement Layer-3 and non-time critical Layer-2 functions for the associated base station and one or more distribution units (DU) that implement the time critical Layer-2 functions and at least some of the Layer-1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RP 226 is configured to implement the radio frequency (RF) interface and the physical layer functions for the associated base station that are not implemented in the DU. The RPs 226 are typically located remotely from each other (that is, the multiple remote units are not co-located), and the one or more BBUs 214 are communicatively coupled to the RPs 226 over a fronthaul network 224. In some examples, the fronthaul network 224 is a switched Ethernet fronthaul network (for example, a switched Ethernet network that supports the Internet Protocol (IP)).

Each RP 226 includes or is coupled to one or more antennas 222 via which downstream radio frequency signals are radiated from the MN 101 to the UE 111 and via which upstream radio frequency signals transmitted by UE 111 are received by the MN 101. In some examples, the RPs 226 need not be co-located with the respective antennas 222 and, for example, can be located at the base of a tower or mast structure, for example, and possibly, co-located with the one or more BBUs 214 of the MN 101.

Similarly, each SN 121 may function substantially as described above in FIG. 1. Further, each SN 121 can be implemented using one or more BBUs 218 that interact with multiple remote units 206 (also referred to here as "RUs," "radio units," "radio points," or "RPs") to implement the various base-station functions necessary to implement the air-interface and to interact with the core network 204 to provide wireless service to various items of user equipment (UEs). In examples where the SN 121 is an LTE base station, the one or more BBUs 218 may comprise a single entity (sometimes referred to as a "baseband controller" or simply a "baseband band unit" or "BBU") that performs Layer-3, Layer-2, and some Layer-1 processing for the cell. In this example, each RU 206 is configured to implement the radio frequency (RF) interface and the physical layer functions for the associated base station that are not implemented in the controller. The multiple RUs 206 are typically located remotely from each other (that is, the multiple remote units are not co-located), and the one or more BBUs 218 are communicatively coupled to the RUs 206 over a fronthaul network 225. In some examples, the fronthaul network 222 is a switched Ethernet fronthaul network (for example, a switched Ethernet network that supports the Internet Protocol (IP)). Also, in some implementations, the fronthaul network 225 and the fronthaul network 224 may be the same fronthaul network.

In examples where the SN 121 is a 5G base station, the one or more BBU entities 218 may also comprises multiple entities, for example, one or more central unit (CU) entities that implement Layer-3 and non-time critical Layer-2 functions for the associated base station and one or more distribution units (DU) that implement the time critical Layer-2 functions and at least some of the Layer-1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RU 206 is configured to implement the radio frequency (RF) interface and the physical layer functions for the associated base station that are not implemented in the DU. The multiple RUs 206 are typically located remotely from each other (that is, the multiple remote units are not co-located), and the one or more BBUs 218 are communicatively coupled to the RUs 206 over a fronthaul network 225. In some examples, the fronthaul network 225 is a switched Ethernet fronthaul network (for example, a switched Ethernet network that supports the Internet Protocol (IP)).

Each RU 206 includes or is coupled to one or more antennas 212, via which downstream radio frequency signals are radiated from the SN 121 to the UE 111, and via which upstream radio frequency signals transmitted by UE 111 are received by the SN 121. In some examples, the RUs 206 need not be co-located with the respective antennas 212 and, for example, can be located at the base of a tower or mast structure, for example, and, possibly, co-located with the one or more BBUs 218 of the SN 121.

In the example shown in FIG. 2, the MN 101 communicates with the UE 111 through respective RPs 226 and antennas 222, which are different from the RUs 206 and antennas 212 used for communications with the UE 111 by the SN 121. In other examples, the MN 101 and the SN 121 communicate with the UE 111 using the same remote units and antennas.

In certain embodiments, MN 101 may communicate with the UE 111 through one or more cells in a primary cell group 107. For example, the MN 101 may provide wireless service via 4G LTE or 5G radio bearers to the UE 111 using one or more cells 103 and 105, which form part of a primary cell group 112, which may have one or more other cells. Similarly, the SN 121 may communicate with the UE 111 through one or more cells in a secondary cell group 127. For example, the SN 121 may provide wireless service via 4G LTE or 5G radio bearers to the UE 111 using one or more cells 123 and 125, which form part of a secondary cell group 127, which may also have one or more other cells. The primary cell group 107 and the secondary cell group 127 function substantially as described above in FIG. 1.

Figure 3:
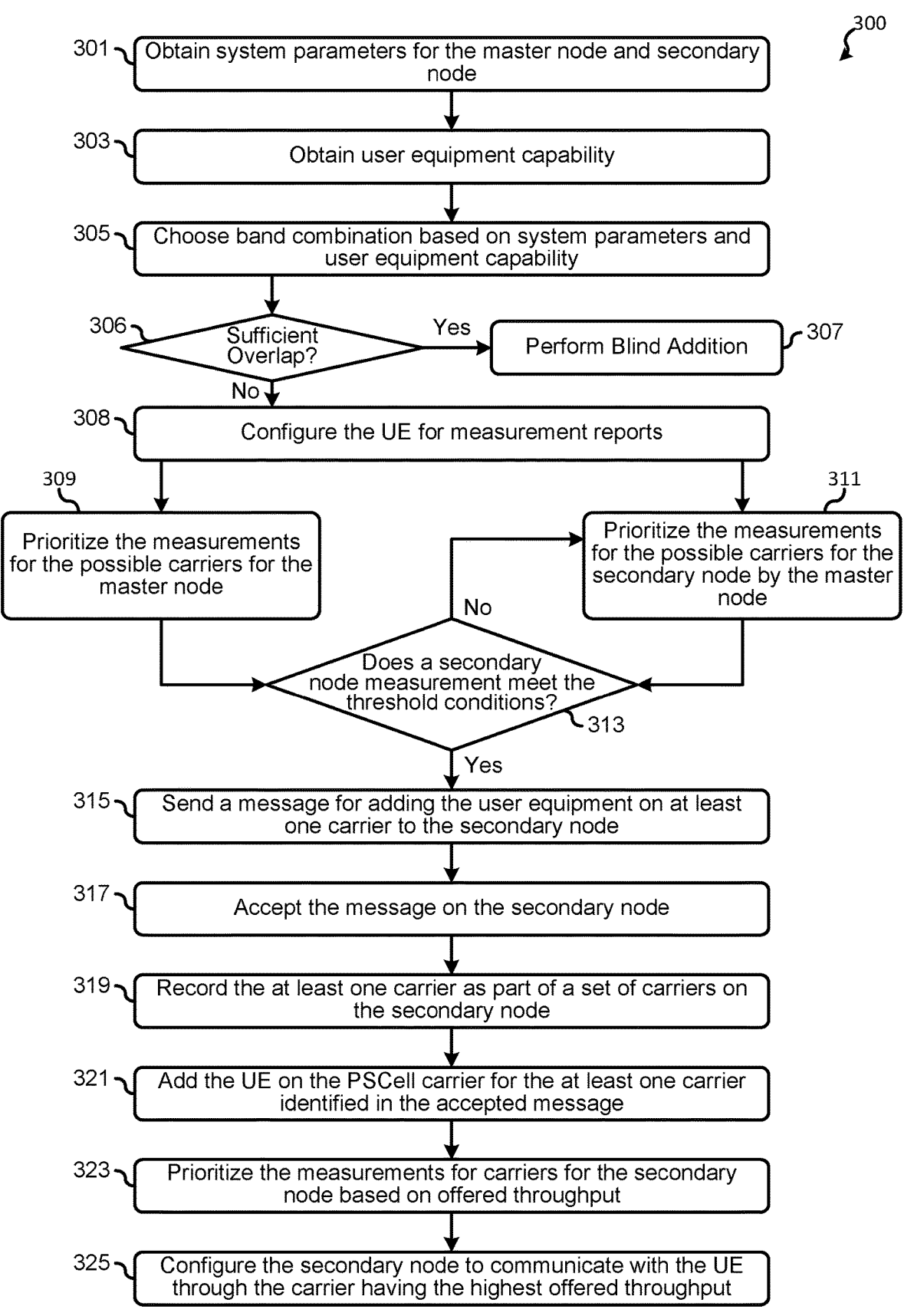
FIG. 3 is a flowchart diagram for a method for a capacity scheme for multiple RAT dual connectivity according to an aspect of the present disclosure.

As described above in FIG. 1, the MN 101 and the SN 121 embodiments described herein provide for systems that can choose the best band combination from possible band combinations in an MR-DC scheme to enhance throughput for the UE 111 and system capacity from the point of view of the MN 101 and the SN 121. The MN 101 and the SN 121 may identify a best band combination by prioritizing carriers in the available band combinations sets that can offer higher throughput while configuring measurements during MR-DC addition. FIG. 3 is a flowchart of a method 300 for identifying the best band combination according to at least one embodiment described herein.

In certain embodiments, the method 300 proceeds at 301, where system parameters are obtained for the MN 101 and the SN 121. For example, the MN 101 and the SN 121 acquire system parameters such as bandwidth, supported bands, MIMO configuration, CA capabilities, and the like. The MN 101 may receive the system parameters from the SN 121 over the interface 227. Further, the method 300 proceeds at 303, where the capability of the UE 111 is obtained. For instance, the MN 101 may communicate with the UE 111 over the PCell 103 to obtain capabilities that include supported band combinations over the different component carriers supported in the MR-DC system, supported QAM, MIMO schemes, and the like.

Additionally, the method 300 proceeds at 305, where band combinations are chosen based on the system parameters and the UE 111 capability to increase throughput/capacity. For example, the MN 101 may identify a set of carriers for the MN 101 and the SN 121 using the identified system parameters and the capabilities of the UE 111 acquired from the PCell 103. Also, the method 300 proceeds at 308, where the UE 111 is configured for measurement reports. For example, the MN 101 may communicate with the UE 111 to configure the UE 111 to provide measurement reports regarding measurements of potential carriers from other nodes, such as the SN 121.

In further embodiments, the method 300 proceeds at 309, where the measurements for the possible carriers are prioritized for the MN 101. Simultaneously, the method 300 proceeds at 311, where the measurements for the possible carriers are prioritized for the SN 121 by the MN 101. For example, the MN 101 may communicate with the UE 111 to acquire information about the possible carriers for the SN 121, while the MN 101 acquires information about the possible carriers for the MN 101. Additionally, the MN 101 and SN 121 may prioritize the different carriers based on throughput for the UE 111.

In additional embodiments, the method 300 proceeds at 313, where the MN 101 determines whether an SN 121 measurement meets the threshold conditions. For example, the MN 101 may communicate with the UE 111 regarding the various cells offered by the SN 121. The MN 101 determines that the signal strength of the cells of the SN 121 experienced by the UE 111 becomes better than a threshold when the UE 111 reports a B1 Inter-RAT measurements on the cells of the SN 121. If the MN 101 does not determine that the SN 121 measurement meets the threshold conditions, the method 300 returns to 311, where the MN 101 continues to monitor and prioritize measurements for the possible carriers for the SN 121. Alternatively, as the measurements for the SN 121 may not be available, the MN 101 may enable CA in the MCG at the MN 101 based on measurements by the MN 101 that satisfy the criteria for an A4 event. When the MN 101 determines that an SN 121 measurement meets the threshold conditions, the method 300 proceeds at 315, where a message is sent to the SN 121 to add the UE 111 on at least one carrier that meets the threshold conditions. For example, the MN 101 may send an SgNB addition request message if the interface 227 is an X2 interface and an S-node addition request if the interface 227 is an Xn to the SN 121 instructing the SN 121 to add the UE 111 on the cell associated with the carrier that meets the threshold conditions. Also, as part of sending the SgNB addition request message containing the band combinations S* or Sx offering the highest throughput/capacity along with the available measurement results for the carriers in S*/Sx, the request may also identify all the carriers in S*/Sx even if measurement reports are not available for all the carriers. Having all the identified carriers, the SN 121 may perform additional measurements and prioritize the measurements for the S*/Sx.

In exemplary embodiments, the method 300 proceeds at 317, where the message is accepted by the SN 121. Additionally, the method 300 proceeds at 319, where at least one carrier is recorded as part of a set of carriers on the secondary node. For example, the SN 121 accepts the message received over the interface 227 from the MN 101 and records the carriers S*/Sx identified in the received message. Further, the method 300 proceeds at 321, where the UE 111 is added on the PSCell 123 for the at least one carrier identified in the accepted message from the MN 101.

In some embodiments, the method 300 proceeds at 323, where measurements for carriers identified by the MN 101 are set up by the SN 121 through the carriers S*/Sx. The SN 121 may then prioritize the identified carriers based on offered throughput. For example, a carrier k' may have a higher throughput than S*/Sx. Accordingly, the SN 121 may configure the carrier k' to have a higher priority in the measurement configuration. Also, once the SN 121 connects to the UE 111 with the PSCell 123, the SN 121 communicates with the UE 111 to identify other potential cells that can be configured for CA addition based on measurements and reports received for carriers/cells in S*/Sx.

In certain embodiments, the systems and methods implemented on the MN 101, SN 121, and UE 111 may include processors and memory that execute instructions and store data that aid in implementing an MR-DC scheme for selecting a carrier combination with higher throughput. The processors may be implemented using software, firmware, hardware, or other appropriate combinations thereof. The processors may be supplemented by, or incorporated in, specially designed application-specific integrated circuits (ASICs) or field programmable gate arrays (FPGAs). The processors may be a general-purpose computer, special-purpose computer, or other programmable logic device. The processors and other computation devices may also include or function with software programs, firmware, or other computer-readable instructions for carrying out various process tasks, calculations, and control functions used in the present methods and systems.

Further, the memory may store computer-executable instructions (such as program modules or components) and may implement the methods described in this description. The processors may execute the computer-executable instructions. Software, firmware, or other execution-capable devices may also execute the computer-readable instructions for carrying out various process tasks, calculations, and generation of data used in the operations of the described methods. The computer-readable instructions may be stored as part of one or more appropriate computer-program products, where a computer-program product may be a set of computer-readable instructions or data structures stored on a computer-readable medium. The computer-readable medium may be a medium that stores data that the processors or other computing devices can access. In certain implementations, the computer-readable medium may form part of the memory.

Computer-readable media may include non-volatile memory devices. Non-volatile memory devices may include semiconductor memory devices such as cache memory, registers, random access memory (RAM), read-only memory (ROM), electrically erasable programmable ROM (EEPROM), or flash memory devices. The non-volatile memory devices may also include magnetic disks (such as internal hard disks or removable disks), optical storage devices (such as compact discs (CDs), digital versatile discs (DVDs), Blu-ray discs), or other media that can store computer-executable instructions or data structures.

FIG. 4 is a flowchart diagram of a method 400 for identifying the best band combination according to at least one embodiment described herein. In some embodiments, method 300 proceeds at 401, where a main plurality of cells associated with a master node is prioritized based on system parameters. The method 400 proceeds at 403, where a secondary plurality of cells associated with a secondary node is prioritized based on the system parameters. Further, the method 400 proceeds at 405, where one or more secondary cells are identified that meet a threshold condition.

In additional embodiments, the method 400 proceeds at 407, where a message is transmitted to the secondary node that identifies the one or more secondary cells. For example, the message may identify SN carriers (for which measurements might not be available) that are part of the band combination set offering the highest throughput. Further, the method 400 proceeds at 409, where measurements are acquired for the user equipment through at least one cell in the one or more secondary cells identified in the message. Additionally, the method 400 proceeds at 411, where the secondary plurality of cells is prioritized based on the acquired measurements. For example, the secondary node may connect to a secondary cell having the highest throughput in the secondary plurality of cells.

EXAMPLE EMBODIMENTS

Example 1 includes a system comprising: user equipment; a secondary node configured to communicate with the user equipment through a secondary plurality of cells in a secondary cell group; and a master node configured to communicate with the user equipment through a main plurality of cells in a master cell group, wherein the master node is configured to: prioritize the main plurality of cells and the secondary plurality of cells based on system parameters for the master node, the secondary node and capabilities of the user equipment; identify one or more secondary cells in the secondary plurality of cells; and transmit a message to the secondary node identifying cells in the one or more secondary cells; wherein the secondary node is configured to: connect to the user equipment through at least one secondary cell in the cells identified in the message in addition to a connection to the main node; and prioritize the secondary plurality of cells based on communications through the at least one secondary cell with the user equipment.

Example 2 includes the system of Example 1, wherein the master node and the secondary node are configured to: obtain the system parameters and the capabilities of the user equipment; identify supported band combinations having a highest throughput in the master cell group and the secondary cell group; and perform a blind addition of the user equipment to cells in the master cell group and the secondary cell group that sufficiently overlap.

Example 3 includes the system of any of Examples 1-2, wherein the master node prioritizes the main plurality of cells based on a throughput calculation for communications between the master node and the user equipment through cells in the main plurality of cells, wherein the master node enables carrier aggregation when measurements are received through more than one cell in the main plurality of cells.

Example 4 includes the system of any of Examples 1-3, wherein the master node transmits the message to the secondary node through an interface, wherein the interface is at least one of: an X2 interface; and an Xn interface.

Example 5 includes the system of any of Examples 1-4, wherein the master node identifies the one or more secondary cells by communicating with the user equipment and identifying one or more cells in the secondary plurality of cells that meet a threshold condition.

Example 6 includes the system of any of Examples 1-5, wherein the secondary node is further configured to add the user equipment to a cell in the secondary plurality of cells having a highest throughput based on measurements of the secondary plurality of cells acquired by the secondary node through the one or more secondary cells.

Example 7 includes the system of any of Examples 1-6, wherein the user equipment is attached to a primary cell in the main plurality of cells.

Example 8 includes the system of any of Examples 1-7, when the user equipment is initially attached to an additional cell not in the main plurality of cells, the master node identifies an additional main plurality of cells comprising the additional cell.

Example 9 includes the system of any of Examples 1-8, wherein the master node monitors additional measurements for the master node, the secondary node, and the user equipment.

Example 10 includes the system of Example 9, wherein when the master node determines that an additional combination of bands offers better throughput than a current band configuration for the user equipment, the master node reconfigures the user equipment to attach to a new cell in an additional main plurality of cells when the main plurality of cells does not support the additional combination of bands.

Example 11 includes a method comprising: prioritizing a main plurality of cells in a master cell group associated with a master node based on system parameters; prioritizing a secondary plurality of cells in a secondary cell group associated with a secondary node based on the system parameters; identifying one or more secondary cells in the secondary plurality of cells that meet a threshold condition; transmitting a message to the secondary node identifying the one or more secondary cells in the secondary plurality of cells; acquiring measurements for user equipment through at least one cell in the one or more secondary cells identified in the message; and prioritizing the secondary plurality of cells.

Example 12 includes the method of Example 11 further comprising: obtaining the system parameters and capabilities of the user equipment by both the master node and the secondary node; identifying supported band combinations having a highest throughput in the master cell group and the secondary cell group; and performing a blind addition of the user equipment to cells in the master cell group and the secondary cell group that sufficiently overlap.

Example 13 includes the method of any of Examples 11-12, wherein prioritizing the main plurality of cells further comprises prioritizing based on a throughput calculation for communications between the master node and the user equipment through cells in the main plurality of cells.

Example 14 includes the method of any of Examples 11-13, wherein transmitting the message to the secondary node comprises transmitting the message to the secondary node through an interface, wherein the interface is at least one of: an X2 interface; and an Xn interface.

Example 15 includes the method of any of Examples 11-14, wherein identifying the one or more secondary cells in the secondary plurality of cells comprises communicating with the user equipment by the master node to identify one or more cells in the secondary plurality of cells.

Example 16 includes the method of any of Examples 11-15, further comprising adding the user equipment to a cell in the secondary plurality of cells, wherein the secondary node is further configured to add the user equipment to the cell in the secondary plurality of cells having a highest throughput based on the acquired measurements of the secondary plurality of cells acquired by the secondary node through the one or more secondary cells.

Example 17 includes the method of any of Examples 11-16, further comprising: determining that the user equipment is attached to an additional cell that is not in the main plurality of cells; and identifying an additional main plurality of cells that comprises the additional cell. Example 18 includes the method of any of Examples 11-17, further comprising monitoring additional measurements for the master node, the secondary node, and the user equipment.

Example 19 includes the method of Example 18, further comprising: determining that an additional combination of bands offers better throughput than a current band configuration for the user equipment; determining if the main plurality of cells supports the additional combination of bands; when the main plurality of cells does not support the additional combination of bands, reconfiguring the user equipment to attach to a new cell in an additional main plurality of cells; and reconfiguring the user equipment for communication through the additional combination of bands.

Example 20 includes a system comprising: user equipment; a secondary node configured to communicate with the user equipment through a secondary plurality of cells in a secondary cell group; and a master node attached to a primary cell in a master cell group and connected to the secondary node through an interface, wherein the master node is configured to communicate with the user equipment through the primary cell, wherein the master node is configured to: prioritize a main plurality of cells and the secondary plurality of cells based on system parameters for the master node, the secondary node and capabilities of the user equipment; identify one or more secondary cells in the secondary plurality of cells; and transmit a message to the secondary node identifying the one or more secondary cells; wherein the secondary node is configured to: acquire measurements for the user equipment through at least one cell in the one or more secondary cells identified in the message in addition to a connection to the main node; prioritize the secondary plurality of cells based on the acquired measurements; and connect the secondary node to a secondary cell having a highest throughput in the secondary plurality of cells.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:

user equipment;

a secondary node configured to communicate with the user equipment through a secondary plurality of cells in a secondary cell group; and a master node configured to communicate with the user equipment through a main plurality of cells in a master cell group, wherein the master node is configured to:

prioritize the main plurality of cells and the secondary plurality of cells based on system parameters for the master node, the secondary node and capabilities of the user equipment;

identify one or more secondary cells in the secondary plurality of cells; and transmit a message to the secondary node identifying cells in the one or more secondary cells;

wherein the secondary node is configured to:

connect to the user equipment through at least one secondary cell in the cells identified in the message in addition to a connection to the main node; and prioritize the secondary plurality of cells based on communications through the at least one secondary cell with the user equipment.

2. The system of claim 1, wherein the master node and the secondary node are configured to:

obtain the system parameters and the capabilities of the user equipment;

identify supported band combinations having a highest throughput in the master cell group and the secondary cell group; and perform a blind addition of the user equipment to cells in the master cell group and the secondary cell group that sufficiently overlap.

3. The system of claim 1, wherein the master node prioritizes the main plurality of cells based on a throughput calculation for communications between the master node and the user equipment through cells in the main plurality of cells, wherein the master node enables carrier aggregation when measurements are received through more than one cell in the main plurality of cells.

4. The system of claim 1, wherein the master node transmits the message to the secondary node through an interface, wherein the interface is at least one of:

an X2 interface; and an Xn interface.

5. The system of claim 1, wherein the master node identifies the one or more secondary cells by communicating with the user equipment and identifying one or more cells in the secondary plurality of cells that meet a threshold condition.

6. The system of claim 1, wherein the secondary node is further configured to add the user equipment to a cell in the secondary plurality of cells having a highest throughput based on measurements of the secondary plurality of cells acquired by the secondary node through the one or more secondary cells.

7. The system of claim 1, wherein the user equipment is attached to a primary cell in the main plurality of cells.

8. The system of claim 1, when the user equipment is initially attached to an additional cell not in the main plurality of cells, the master node identifies an additional main plurality of cells comprising the additional cell.

9. The system of claim 1, wherein the master node monitors additional measurements for the master node, the secondary node, and the user equipment.

10. The system of claim 9, wherein when the master node determines that an additional combination of bands offers better throughput than a current band configuration for the user equipment, the master node reconfigures the user equipment to attach to a new cell in an additional main plurality of cells when the main plurality of cells does not support the additional combination of bands.

11. A method comprising:

prioritizing a main plurality of cells in a master cell group associated with a master node based on system parameters;

prioritizing a secondary plurality of cells in a secondary cell group associated with a secondary node based on the system parameters;

identifying one or more secondary cells in the secondary plurality of cells that meet a threshold condition;

transmitting a message to the secondary node identifying the one or more secondary cells in the secondary plurality of cells;

acquiring measurements for user equipment through at least one cell in the one or more secondary cells identified in the message; and prioritizing the secondary plurality of cells.

12. The method of claim 11 further comprising:

obtaining the system parameters and capabilities of the user equipment by both the master node and the secondary node;

identifying supported band combinations having a highest throughput in the master cell group and the secondary cell group; and performing a blind addition of the user equipment to cells in the master cell group and the secondary cell group that sufficiently overlap.

13. The method of claim 11, wherein prioritizing the main plurality of cells further comprises prioritizing based on a throughput calculation for communications between the master node and the user equipment through cells in the main plurality of cells.

14. The method of claim 11, wherein transmitting the message to the secondary node comprises transmitting the message to the secondary node through an interface, wherein the interface is at least one of:

an X2 interface; and an Xn interface.

15. The method of claim 11, wherein identifying the one or more secondary cells in the secondary plurality of cells comprises communicating with the user equipment by the master node to identify one or more cells in the secondary plurality of cells.

16. The method of claim 11, further comprising adding the user equipment to a cell in the secondary plurality of cells, wherein the secondary node is further configured to add the user equipment to the cell in the secondary plurality of cells having a highest throughput based on the acquired measurements of the secondary plurality of cells acquired by the secondary node through the one or more secondary cells.

17. The method of claim 11, further comprising:

determining that the user equipment is attached to an additional cell that is not in the main plurality of cells; and identifying an additional main plurality of cells that comprises the additional cell.

18. The method of claim 11, further comprising monitoring additional measurements for the master node, the secondary node, and the user equipment.

19. The method of claim 18, further comprising:

determining that an additional combination of bands offers better throughput than a current band configuration for the user equipment;

determining if the main plurality of cells supports the additional combination of bands;

when the main plurality of cells does not support the additional combination of bands, reconfiguring the user equipment to attach to a new cell in an additional main plurality of cells; and reconfiguring the user equipment for communication through the additional combination of bands.

20. A system comprising:

user equipment;

a secondary node configured to communicate with the user equipment through a secondary plurality of cells in a secondary cell group; and a master node attached to a primary cell in a master cell group and connected to the secondary node through an interface, wherein the master node is configured to communicate with the user equipment through the primary cell, wherein the master node is configured to:

prioritize a main plurality of cells and the secondary plurality of cells based on system parameters for the master node, the secondary node and capabilities of the user equipment;

identify one or more secondary cells in the secondary plurality of cells; and transmit a message to the secondary node identifying the one or more secondary cells;

wherein the secondary node is configured to:

acquire measurements for the user equipment through at least one cell in the one or more secondary cells identified in the message in addition to a connection to the main node;

prioritize the secondary plurality of cells based on the acquired measurements; and connect the secondary node to a secondary cell having a highest throughput in the secondary plurality of cells.

\* \* \* \* \*